Jan. 17, 1956
P. J. BILY
2,731,234
FLUID HANDLING APPARATUS FOR USE
WITH WELL DRILLING EQUIPMENT
Filed April 14, 1952
3 Sheets-Sheet 1
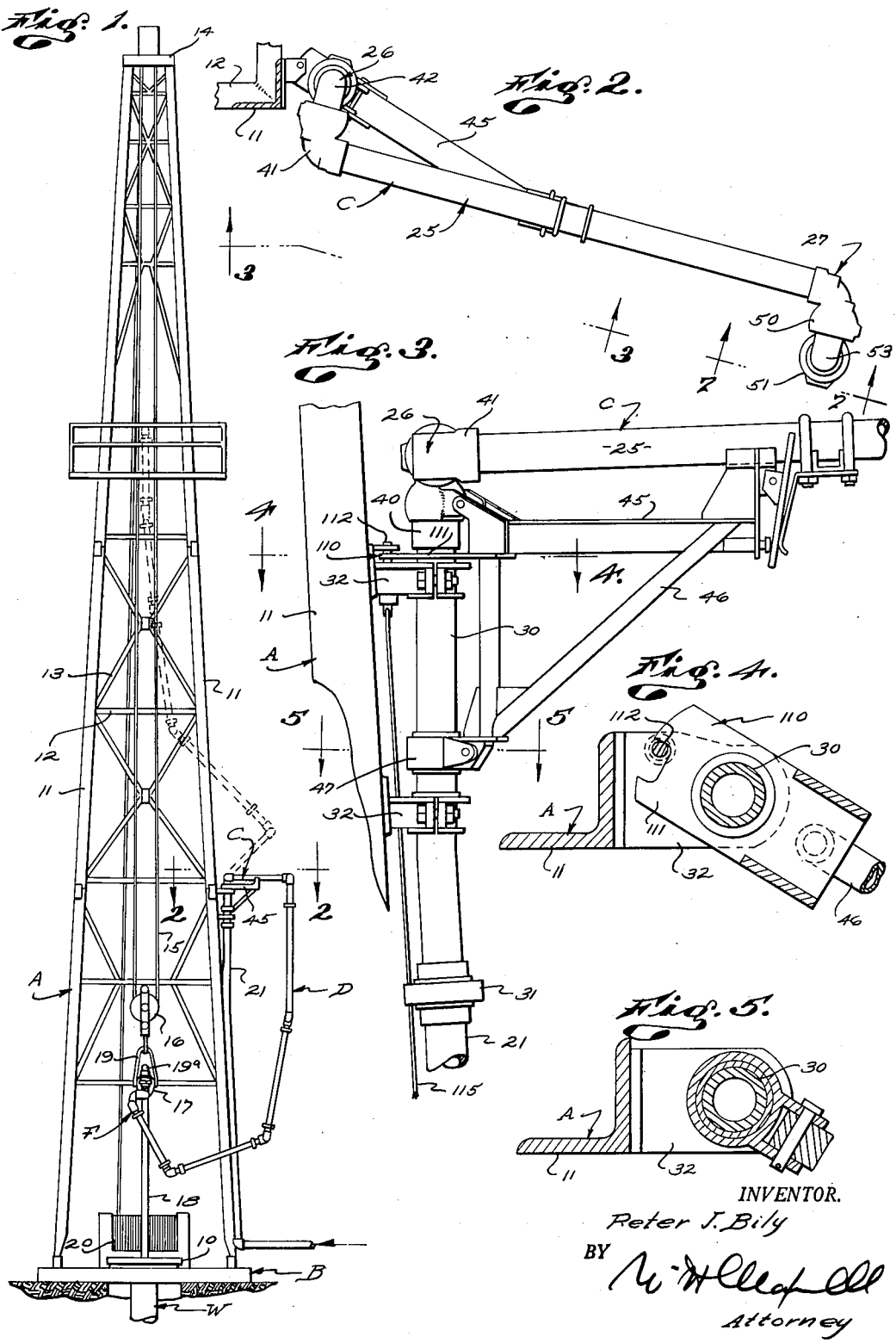
INVENTOR.
Peter J. Bily
BY
Attorney

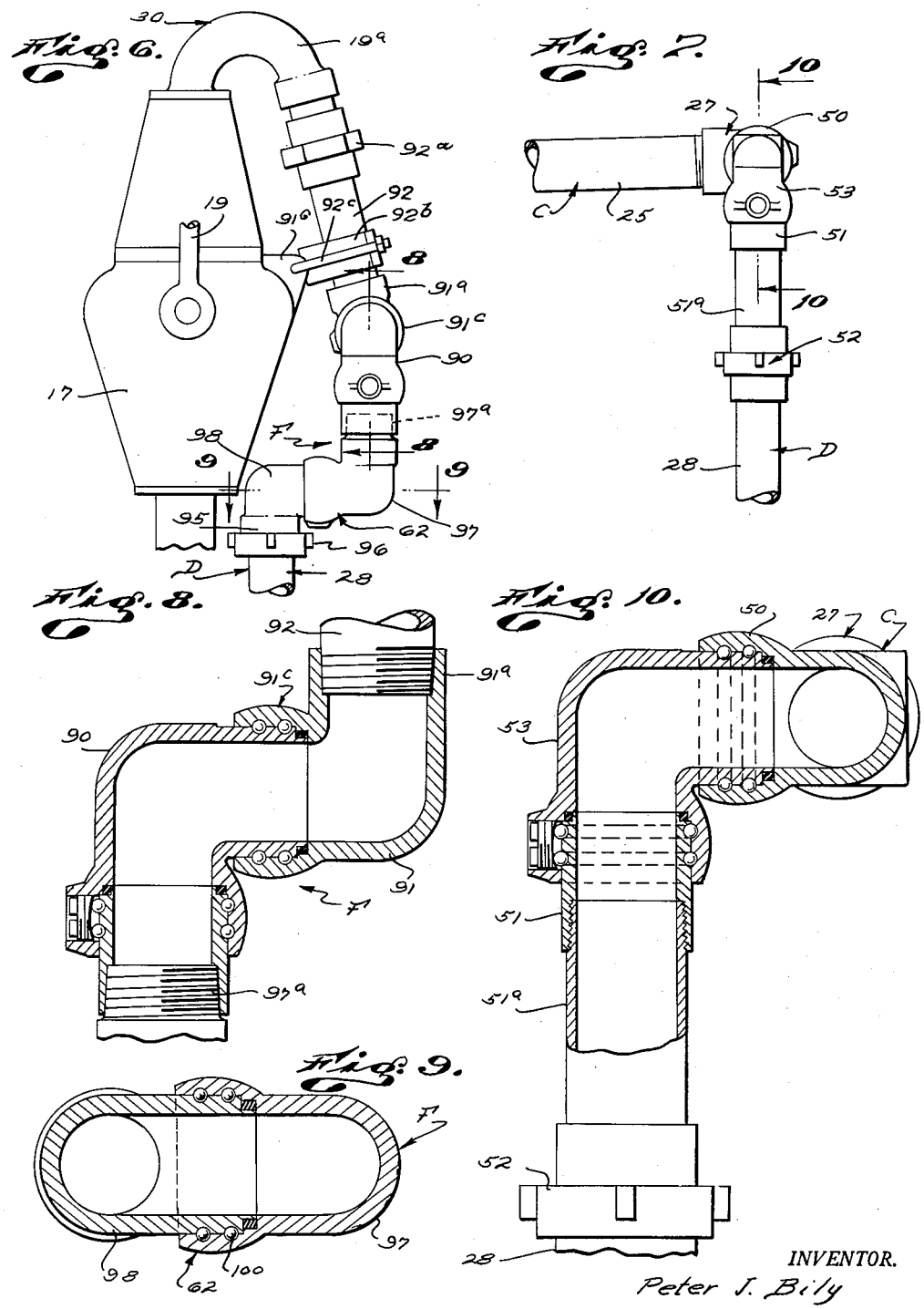

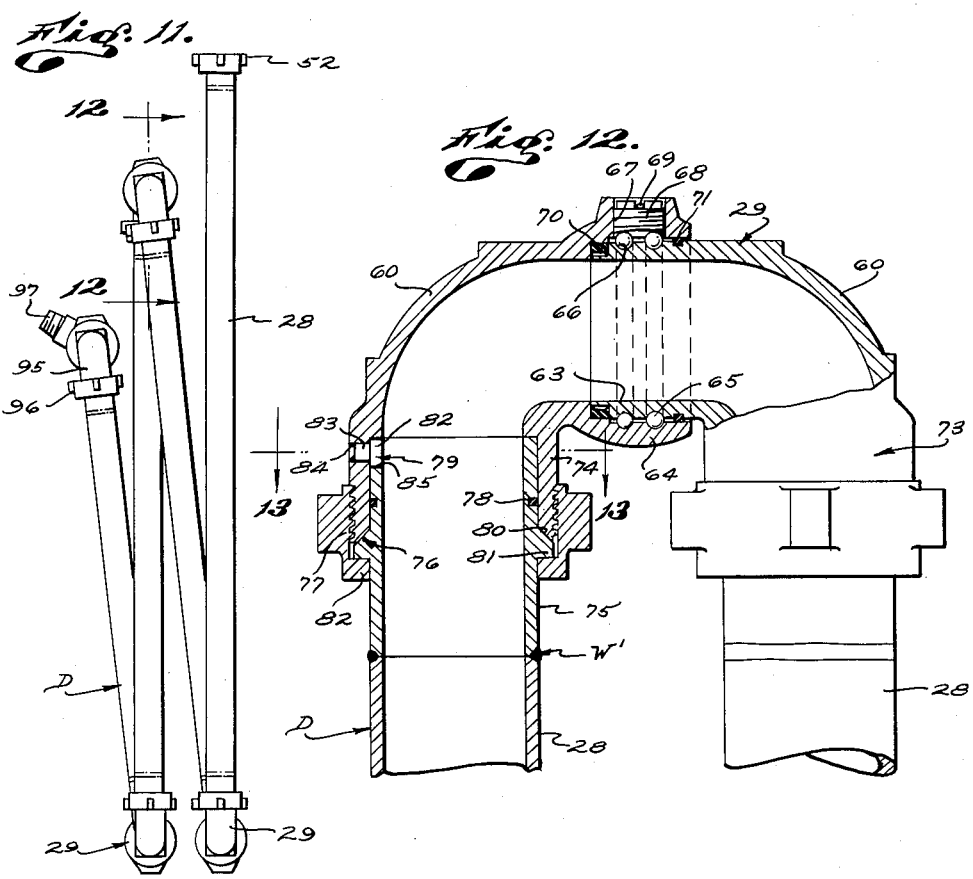

United States Patent Office 2,731,234
Patented Jan. 17, 1956

2,731,234

FLUID HANDLING APPARATUS FOR USE WITH WELL DRILLING EQUIPMENT

Peter J. Bily, Brea, Calif., assignor to Chiksan Company, Brea, Calif., a corporation of California Application April 14, 1952, Serial No. 282,134

2 Claims. (Cl. 255—24)

This invention relates to fluid handling apparatus for use with or as a part of well drilling equipment, and it is a general object of the invention to provide a practical, dependable and improved structure providing a fluid connection between a supply line or standpipe and a head or swivel occurring on a drilling string, or the like.

It is a general object of this invention to provide improved fluid handling apparatus particularly useful where the derrick of the well drilling rig is laterally offset from the vertical axis of the well, and where the portion of the present apparatus that may be referred to as the flexible duct or rotary hose is handled at the exterior of the derrick.

It is a further object of this invention to provide fluid handling apparatus of the character referred to, which effectively and dependably couples the standpipe occurring at the derrick and the swivel occurring on the drilling string so that the swivel is free to operate rapidly from one end of its travel to the other without danger of the rotary hose or the parts joined thereto becoming kinked, or so operating as to interfere with other parts or to possibly cause damage to well equipment or injury to personnel.

It is a further object of this invention to provide fluid handling apparatus of the general character referred to characterized by a rotary hose element, or duct, in which the pipe sections are coupled or related for free pivotal movement relative to each other only about axes transverse of the hose and which are parallel to each other with the result that the hose will not flex or kink laterally.

It is another object of this invention to provide apparatus of the general character referred to including a rotary hose or duct of the type mentioned and structures coupling such duct to a standpipe and to a swivel so that, although the hose is free to swing or fold in one plane only, the swivel is free to move in the manner characteristic of such an element without creating strain or undesirable flexure in any part of the apparatus.

It is a further object of this invention to provide a rotary hose or duct construction for fluid handling apparatus of the general character referred to characterized by pipe sections and swing joints between the sections and releasably coupled thereto, so that they can be individually or selectively removed for purpose of repair or replacement, as circumstance may require, without requiring inconvenient or unwieldy manipulation of any parts of the structure.

The apparatus as provided by the present invention is adapted to couple a standpipe at a corner of a derrick with a swivel on the kelly of the well drilling string, and it includes, generally, an arm provided at the upper end of the standpipe for limited movement about a vertical axis and also for limited movement about a horizontal axis. A universal swivel fitting occurs at the outer or terminal end of the arm and delivers fluid to the element of the apparatus that may be referred to as the rotary hose or flexible duct. The duct is preferably joined to the universal fitting on the arm by a releasable connection, and in its preferred form it includes a plurality of pipe sections progressing in length as they proceed from the arm. Adjacent or adjoining pipe sections are joined by swing joints, the axes of which are parallel and transverse of the duct. Through this construction the duct as a unit can flex or swing in one plane only, and its fluid receiving end is carried for limited movement in various directions as required to accommodate the duct to the action of the swivel. The terminal or delivery end of the duct is coupled to the swivel of the well drilling string by a universal type of fitting connecting the duct with the gooseneck of the swivel.

The various objects and features of my invention will be fully understood from the following detailed description of a typical preferred form and application of my invention, throughout which description reference is made to the accompanying drawings, in which:

Fig. 1 is a view illustrating the front of a well drilling rig wherein the derrick is constructed and located relative to the axis of the well and the fluid handling apparatus of the present invention is so arranged as to couple the standpipe at the exterior of the derrick with a swivel on a kelly projecting from the well. Fig. 2 is an enlarged plan view taken substantially as indicated by line 2—2 on Fig. 1. Fig. 3 is an enlarged view of the parts shown in Fig. 2, being a view taken substantially as indicated by line 3—3 on Fig. 2. Fig. 4 is an enlarged plan section taken as indicated by line 4—4 on Fig. 3. Fig. 5 is an enlarged plan section taken as indicated by line 5—5 on Fig. 3. Fig. 6 is an enlarged view taken at the swivel end showing in elevation the delivery end of the rotary hose coupled to the gooseneck of the swivel. Fig. 7 is an enlarged view taken substantially as indicated by line 7—7 on Fig. 2 showing the receiving end of the rotary hose coupled to the outer or delivery end of the arm which is an element of the head connected to the standpipe. Fig. 8 is an enlarged detailed sectional view taken substantially as indicated by line 8—8 on Fig. 6. Fig. 9 is an enlarged detailed sectional view taken substantially as indicated by line 9—9 on Fig. 6. Fig. 10 is an enlarged detailed view taken as indicated by line 10—10 on Fig. 7, certain of the parts being in section and other parts in elevation. Fig. 11 is a side elevation of the rotary hose incorporated in the apparatus showing this unit free of other parts of the apparatus and in a collapsed or compressed condition. Fig. 12 is an enlarged detailed sectional view of a part of the rotary hose being a view taken substantially as indicated by line 12—12 on Fig. 11, certain of the parts being shown in section and other parts in elevation. Fig. 13 is an enlarged sectional view taken as indicated by line 13—13 on Fig. 12. Fig. 14 is an enlarged side elevation of an element of a coupling means incorporated in the rotary hose showing this element alone, or free of other parts of the structure. Fig. 15 is a diagrammatic plan view showing diagrammatically the manner in which the hose extends from the outer corner of the derrick to the swivel in line with the well.

The apparatus as provided by the present invention can be used to advantage in or as a part of a well drilling rig wherein the derrick of the rig is laterally offset from the vertical axis of the well so that the rotary hose occurs at the exterior of the derrick. This particular relationship of parts is illustrated in the drawings where the derrick A is shown projecting upward from a base or platform B, through which the well W extends. The derrick A is laterally spaced or offset from the well W so that the rotary unit 10 on the well above the platform B is at the exterior of the derrick forward thereof as viewed in Fig. 1 of the drawings.

In the particular case illustrated, the derrick A includes posts 11, beams 12, and braces 13, and a crown block 14 is supported at the upper end of the derrick. The crown block handles or carries line 15 which operates a traveling block 16. The traveling block is coupled to a swivel 17 occurring at the upper end of a kelly 18 by means of the bail 19 of the swivel. The line 15 is operated by a draw works 20 so that the traveling block 16 is operated vertically between a down position such as is shown in Fig. 1 and an up position in the upper portion of the derrick A.

The rig as illustrated is adapted to drill by means of the rotary method and, therefore, mud or drilling fluid is supplied under pressure to a standpipe 21 provided at one corner of the derrick. The standpipe projects upwardly to a suitable point intermediate the upper and lower positions of the traveling block.

The apparatus as provided by the present invention is adapted to so connect the standpipe 21 and the swivel 17 on the kelly 18 that drilling fluid from the standpipe is delivered to the swivel safely and dependably regardless of the vertical position of the swivel and regardless of the manner or rapidity with which the swivel may be operated.

The apparatus as provided by the present invention includes, generally, a mechanism or head C provided on or at the upper end of the standpipe 21 and characterized, generally, by an elongated arm 25, a universal fitting 26 coupling the arm and standpipe for movement of the arm about the vertical axis and also about a horizontal axis, and a universal fitting 27 at the outer or delivery end of the arm and through which fluid is supplied to the rotary hose or flexible duct D. The duct D of the apparatus provided by the present invention is an elongate fluid handling duct, the receiving end of which is coupled to the fitting 27 and in accordance with the invention it is characterized by a plurality of pipe sections 28 and swivel joints 29 connecting the pipe sections. The present invention provides a swivel fitting F connecting the delivery end of the duct D and the gooseneck 30 of the swivel 17.

The head C of the apparatus provided by the present invention is best illustrated on sheet 1 of the drawings, and this portion of the structure is fully described and is the subject of claims in application Serial No. 275,737, filed March 10, 1952, entitled "Apparatus for Handling Drilling Fluid in Connection With a Derrick."

The particular head C illustrated in the drawings includes a substantially straight vertical manifold 30, the lower end of which is coupled to the upper end of the standpipe 21 by means of a releasable coupling 31. The manifold is mounted in a fixed position at the exterior of derrick 11 adjacent one of the forward corners thereof and as shown in the drawings, mounting brackets 32 are provided to mount the manifold on a leg of the derrick. The releasable connection 31 couples the manifold and standpipe so that fluid from the standpipe is received by the manifold.

The arm 25 of head C is an elongate tubular member and may be a simple, straight element as shown in the drawings. The universal fitting 26 connecting the inner or receiving end of the arm 25 and the manifold 30 includes, generally, a straight tubular receiving section 40 on the upper end of manifold 30 and projecting up therefrom. An L-shaped delivery section 41 is connected to the inner or receiving end of arm 25, and a central or middle L-shaped section 42 is provided between the sections 40 and 41. The several sections of the universal joint 26 are meshed or telescopically engaged where they adjoin, and suitable coupling means connect them together for relative rotation.

In the preferred construction the meshing or telescopically related parts of the fitting sections just referred to can be rotatably coupled by one or more annular series of balls engaged between the parts similar to that illustrated in Figs. 8, 9 and 10 of the drawings. In Fig. 10 there is illustrated a construction whereby the balls can be arranged in or removed from operating position as required. Further, it is to be understood that suitable sealing and or packing means may be provided between or in connection with sections of the fitting to prevent leakage of fluid between sections.

With the construction just described the universal fitting 26 provides for turning or swinging of arm 25 about a vertical axis coincidental with that of the manifold 30 and for pivotal movement about a horizontal axis intersecting the longitudinal axis of the arm and the vertical axis of the manifold.

In the particular construction illustrated a bracket 45 is carried by the middle section 42 of the fitting 26 and is braced from the manifold 30 and serves as a stop limiting pivotal movement of the arm 25 about the horizontal axis so that the arm will not swing down or below a substantially horizontal position such as is illustrated in Fig. 1 and Fig. 3 of the drawings. In the case illustrated brace members 46 depend from the bracket and a collar 47 is connected to the brace member and surrounds the manifold 30. With the construction just described the bracket 45 remains in position to limit or stop the downward movement of arm 25 regardless of the positioning of the arm about the vertical axis above described.

A stop means 110 is provided to limit the horizontal movement of arm 25, and in the case illustrated this means includes a notched bracket 111 projecting from bracket 45 and a pin 112 cooperating with the notched bracket so that the pivotal movement of the assembly formed by bracket 45 and arm 25 is limited depending upon the extent of the notch in bracket 111. The pin 112 is slidably carried by a suitable mounting for movement into and out of position where it cooperates with the notched bracket 111. In the particular case illustrated pin 112 is slidably carried by one of the mounting brackets 32 and it has an operating member, or rod 115, attached to it, which rod may be extended to a point where it can be conveniently manipulated to move the pin into and out of operating position. The details of this structure are clearly illustrated in Figs. 3 and 4 of the drawings.

The universal fitting provided at the outer or delivery end of arm 25 is shown as including an L-shaped receiving section 50 carried on the terminal end of arm 25 and having one end projecting horizontally or laterally therefrom. A discharge or delivery section 51, which is a straight tubular element, is connected to the duct D as by a releasable coupling 52, and a middle or center section 53, L-shaped in form, connects the sections 50 and 51.

The several sections of the universal fitting 27 are preferably engaged or telescopically related and are coupled by suitable means so that they rotate freely relative to each other and suitable sealing or packing means occur at or between the sections to prevent leakage of fluid therefrom. It is to be understood that the sections of the construction just described can be coupled by annular series of balls in the manner illustrated in Figs. 8 to 10.

Through the construction just described the receiving end of the duct D is coupled to the delivery end of the arm 25 so that it can swing freely about a horizontal axis that extends transversely of the terminal end of the arm and its receiving end can turn or rotate about its longitudinal axis. Further, the receiving end portion of the duct is supported laterally offset from the arm 25 so that the duct can be swung vertically past the arm 25 between a position such as is shown in full lines in Fig. 1 and that shown in dotted lines in Fig. 1.

The releasable connection 52 is shown in the drawings as a union type of connection coupling an extension 51ᵃ of the fitting section 51 with the receiving end of the rotary hose.

The rotary hose or duct D as provided by the present invention involves a plurality of rigid fluid handling sections or pipes 28, swing joints 29 coupling adjacent pipes 28 and a swivel fitting 62 at the terminal end of the duct. In the preferred form of the invention the several pipe sections 28 are of different lengths, the longest section being the one at the receiving end of the duct and the other sections being arranged so that they are progressively shorter as they proceed to the discharge end of the duct. In practice the pipe sections 28 of the duct can be varied in length and in number, as circumstances require, it being preferred to proportion the pipe sections and to provide a number of such sections substantially as shown in Fig. 1 of the drawings so that the duct adequately accommodates full travel of the swivel 17.

In accordance with the present invention the several swing joints 29 connecting the pipe sections 28 are alike, and each such joint provides for pivotal movement about a single axis and that axis is transverse of the duct and is horizontally disposed.

In the preferred form of construction as shown in the drawings each swivel joint 29 includes two similar L-shaped sections 60 with inner ends engaged or telescopically related so that one has a pin portion 63 entered in a socket portion 64 of the other. One or more annular series of balls 65 couple the sections 60 for relative rotation. The balls are carried in registering grooves 66 in the telescopically related parts, and the socket portion 64 is provided with an access opening 67 to pass the balls. The opening 67 is normally closed by a removable plug 68 locked in position by a key 69. A packing means 70 is provided between the telescopically related parts and a suitable sealing ring 71 prevents foreign matter from entering between these parts. Details of the construction just described may be the same as those employed between the telescopically related sections hereinabove described and may be the same as those illustrated in Figs. 8 to 10 of the drawings.

A coupling means 73 is provided at the outer end of each section 60 to releasably connect the section with a pipe section 28 of the duct. In the particular case illustrated the coupling means 73 are alike and each includes a tubular joint section 74 integral with and projecting from the outer end of a joint section 60, a pipe section 75 fixed to a pipe section 28 as by welding W, or the like, stop means 76 positioning the sections 74 and 75 longitudinally relative to each other, a collar 77 coupling the said sections, being preferably threaded to one and abutting the other, packing means 78 providing sealing engagement between the sections, and means 79 keying the sections together against relative rotation.

The stop means 76 includes a shoulder 80 on a rib 81 provided on the exterior of the pipe section 75, and the shoulder 80 abuts a shoulder provided at the outer end of the joint section 74. The collar 77 is shown threaded on the exterior of the joint section 74 and has an inwardly projecting flange 82 that abuts the rib 81.

The means 79 is shown as including a key 82 fixed to the joint section 74 as by means of a stem 83 secured to the joint section by welding 84. The key engages in a notch-shaped recess 85 provided at the terminal end of the portion 86 of section 75, which is engaged within the section 74 or as clearly illustrated in Fig. 12 of the drawings.

The pipe sections 75 of the couplings 73 are welded to the ends of the pipe sections 28 of the duct so that they cannot turn relative thereto, and the means 79 serves to key the sections 75 to the sections 74 so that inner telescopically related end portions of the joint sections 60 are horizontally disposed and extend transversely of the duct. As a result of this construction and relationship of parts, the duct D is free to be folded or flexed only in one plane and through the releasable couplings 73 the swing joint 29 can be released from the pipe sections 28, as circumstances require, for the purpose of making repairs, replacement or for servicing, as circumstances require.

As a result of the means 79 provided in the couplings 73 the swing joints can be easily and quickly assembled with the pipe sections 28 without danger of misalignment or improper relationship of parts as they will only assemble with the parts of the hose related in the manner desired.

The particular swing joint construction above described and shown in Figs. 12, 13 and 14 of the drawings is more fully described and is claimed in pending application Serial No. 282,133, filed April 14, 1952, entitled "Antifriction Swing Joint."

The swivel fitting F provided to connect the swivel 17 and the delivery end of the duct D is best illustrated in Fig. 6 of the drawings. The particular swivel 17 illustrated in the drawings is of the type commonly used at the upper end of a kelly 18 as a means conducting drilling fluid to the kelly from a rotary hose or duct, while the kelly is driven by a rotary unit 10. The gooseneck 19a of swivel 17 is shown as being of the usual form that projects upwardly and then laterally and somewhat downwardly.

The swivel fitting F connects the delivery end of duct D and the gooseneck 19a of swivel 17. The swivel fitting F is shown as including an L-shaped receiving section 90 fixed to the delivery end of duct D and an L-shaped delivery section 91 swivelly connected to section 90. A tubular extension 92 projects up and is releasably connected to the gooseneck 19a by a releasable coupling 92a. The sections 90 and 91 are telescopically engaged and are rotatably coupled as by means of constructions such as are shown in Figs. 8, 9, 10 and 12. The sections 90 and 91 are connected for relative rotary motion about an axis intersecting that of the delivery end of the duct and intersecting the axis of the extension 92 and the coupling 92a that connects to the gooseneck. The pivotal axis between sections 90 and 91 is horizontally disposed. The extension 92 provides support for the delivery end portion 91a of section 91 since the extension 92 is rigidly secured to the body of the swivel 17 through a bracket 91g. The bracket 91g is provided on and projects from the body of the swivel. A sectional block or shoe 92b surrounds extension 92 and a tie or clamp 92c engaged through the bracket 91g holds the shoe assembled on the extension 92 and holds the shoe engaged with the bracket.

In the particular case illustrated as swivel fitting 62 at the delivery end of the hose D includes a receiving section 95 connected to the delivery end of the last pipe section 28 by a releasable coupling 96, an L-shaped delivery section 97 fixed to the section 90 of the swivel fitting F as by a screw threaded joint 97a, and an L-shaped middle section 98 rigid with the receiving section 95 and swivelly connected to the section 97 by a joint established as by means of annular series of balls 100.

It is to be understood that the several sections, that is, sections 90 and 91 of the swivel F, may be rotatably coupled by means such as are illustrated in Figs. 8, 9, 10 and 12.

From the foregoing description it will be apparent that the duct D, shown apart from the other elements in Fig. 11 of the drawings, may be easily and quickly coupled to the delivery end of the head C and to the swivel fitting connected to the swivel 17 to provide a dependable effective fluid handling connection whereby fluid from the standpipe 21 is delivered therefrom to the kelly connected to the swivel 17. The construction as provided by the present invention provides for positioning of arm 25 so that it projects laterally away from the derrick and somewhat forward therefrom, while the receiving end portion of the duct D connects to the delivery end of the arm offset therefrom to freely operate between the positions illustrated in Fig. 1. The pivotal connection provided in the swivel fitting F and in the swivel fitting 62 at the terminal end of the duct D provide for flexibility or freedom of movement of the swivel 17 relative to the delivery end of the duct D when the swivel is in its various operating positions and regardless of whether it is in an up or a down position. With the construction provided by the present invention the various parts subject to or likely to require servicing or repair can be easily and quickly removed, or replaced, and the structure as a whole is such that it will handle a substantial flow of drilling fluid at high pressure and with safety.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus for use with a well drilling rig adapted to operate a swivel over a well and including a vertically disposed derrick and a fluid supply pipe extending up to a point intermediate the upper and lower ends of the derrick and at the exterior of the derrick including, a substantially straight fluid handling arm of substantial length, means adapted to couple the pipe and the inner end of the arm with the arm extending laterally of the derrick at the exterior thereof including a fitting with parts pivotally connected for relative movement about vertical and horizontal axes, one of said parts being fixed to the pipe and another being fixed to the inner end of the arm and a flexible duct having one end coupled with the outer end of the arm and the other end adapted to be coupled to the swivel, the duct including rigid tubular members and swing joints connecting the members together in a continuous series, each swing joint having a single pivotal axis and having releasable couplings releasably connecting the joint to adjacent tubular members, each releasable coupling including means keying the said tubular members against relative rotation to the joint to which they are coupled and with the axis of the joint transverse of the duct, and the axes of the several joints being parallel with each other and transverse of the duct whereby the duct is flexible in one plane only.

2. Apparatus for use with a well drilling rig operating a swivel over a well and including a vertically disposed derrick and a fluid supply pipe at the exterior of the derrick and extending up to a point intermediate the upper and lower ends of the derrick including, a substantially straight fluid handling manifold, means releasably coupling the manifold to the pipe to project upwardly therefrom, means mounting the manifold on the derrick, a substantially straight tubular arm of substantial length, a fitting coupling the inner end of the arm and the manifold for movement of the arm about a vertical and a horizontal axis, a swivel fitting connected to the outer end of the arm, a flexible duct having one end connected to the last mentioned fitting, and a swivel fitting adapted to connect the other end of the duct to the swivel for universal movement relative thereto and including an L-shaped body and L-shaped end members rotatably coupled to the ends of the body and one connected to the said other end of the duct and the other to the swivel, the first mentioned fitting including an L-shaped center section, a straight end section connected to the manifold and rotatably coupled to one end of the center section, and an L-shaped end section having one end connected to the arm and the other end rotatably coupled to the other end of the center section, the duct including rigid tubular members and swing joints connecting the members together in a continuous series, each joint having a single pivotal axis and having couplings connecting the joint to adjacent tubular members, each coupling including means keying the said tubular members against relative rotation to the joint to which they are coupled and with the axis of the joint transverse of the duct, and the axes of the several joints being parallel with each other and transverse of the duct whereby the duct is flexible in one plane only.

References Cited in the file of this patent

UNITED STATES PATENTS

| Number | Name | Date |
|---|---|---|
| 991,501 | Graves | May 9, 1911 |
| 1,852,632 | Wagner et al. | Apr. 5, 1932 |
| 1,938,829 | Hamer | Dec. 12, 1933 |
| 1,963,368 | Johnson | June 19, 1934 |
| 2,168,837 | York | Aug. 8, 1939 |
| 2,509,119 | Warren | May 23, 1950 |
| 2,512,006 | Bagnard | June 20, 1950 |
| 2,537,683 | Maier | June 20, 1950 |